June 29, 1965

SENJIN KITANO 3,191,878

APPARATUS FOR WINDING WIRE ON THE CORE OF
STATIONARY INDUCTION MEANS

Filed Sept. 21, 1962

INVENTOR.
SENJIN KITANO
BY
Reynolds & Christensen
ATTORNEYS

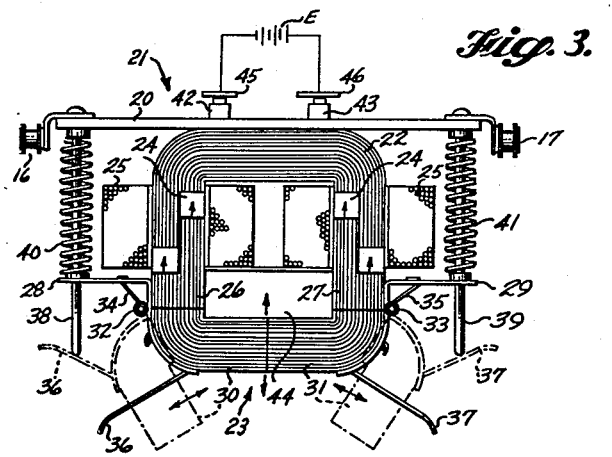
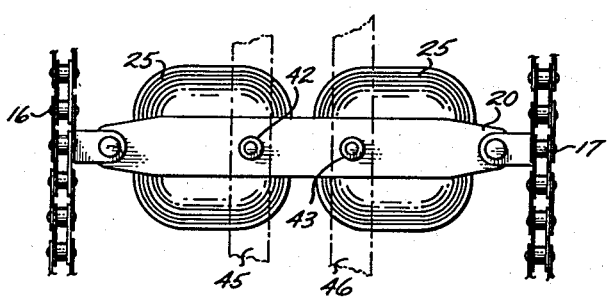
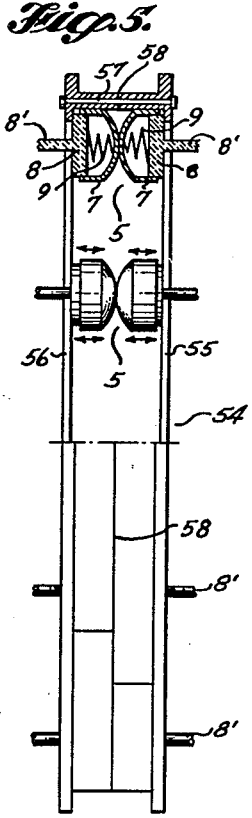

United States Patent Office 3,191,878
Patented June 29, 1965

3,191,878
APPARATUS FOR WINDING WIRE ON THE CORE
OF STATIONARY INDUCTION MEANS
Senjin Kitano, 40 Nishino Rikyu-cho, Yamashina,
Higashiyama-ku, Kyoto, Japan
Filed Sept. 21, 1962, Ser. No. 225,199
Claims priority, application Japan, Aug. 4, 1962,
37/33,486
3 Claims. (Cl. 242—4)

This invention relates to a new and improved apparatus for winding wire on the core of the stationary induction means.

The simplest method of winding conductive wire on a closed magnetic core is that of manual winding. This method may be advantageous in case the central opening of the core is comparatively small, but it is troublesome and time-consuming, resulting in the high cost of the products. If the opening of the core is relatively large, a winding machine may be employed.

For employing a winding machine for forming coils on the closed magnetic core, it is especially required that the conductor be as free as possible from bending or extending during the course of winding operation in order to avoid deterioration of its characteristics; and that the machine be of such construction that no parts of the machine will interfere with increasing layers of winding on the core. Satisfactory fulfillment of the last requirement in the winding machine will make it possible to wind coils around a closed magnetic core, however small the opening of the core may be.

Prior to the present invention, various types of such winding machine have been employed for the purpose. In one of them, a ring holding the conductive wire to be wound on a closed magnetic core is arranged in linked relationship with the core, so that the ring will pass through the opening of the core and interfere with the wound layers of coil as they increase on the core. Therefore, this type of machine may be used only with cores having central openings large enough to allow for the holding ring and the desired number of turns of wound wire. The use of such cores will naturally cause an increase, constructionally, in the weight and bulkiness of the product and, electromagnetically, in the length of the magnetic path, and iron, copper and other losses thereof.

In another of the conventional types of winding machine, a closed magnetic core is disposed between a pair of pulleys spaced apart, around which is wound a length of conductive wire in a desired number of turns, part of the wire passing through the opening of the closed core. As the conductive wire wound around the pair of pulleys is driven by any suitable means to run round the pulleys like an endless belt, the wire is drawn out therefrom and wound on a leg of the core. This method, however, will cause much bending and extending to the wire and consequently deterioration of its characteristics, and application of the method is limited by the thickness of the wire. What is more disadvantageous with the method, it involves complication of means for rotating the loop of wound wire about a leg of the closed magnetic core and of means for drawing wire out of the loop and winding it around the core as rotation of the loop progresses.

The disadvantages and difficulties encountered in the prior art have been completely overcome by the apparatus in accordance with the present invention.

It is therefore the primary object of the invention to provide an improved and useful apparatus for winding a coil on the core, especially of a closed magnetic circuit type, of stationary induction means, wherein a loop made of a single length of conductive wire wound in a predetermined number of turns may be rotationally driven through the central opening of the core in such manner that no part of the drive means may pass through the opening.

Another object of the invention is to provide a coil-winding apparatus as aforesaid, in which the drive means includes electromagnetically operated means for gripping and moving the loop of wire.

Still another object of the invention is to provide a coil-winding apparatus having the foregoing characteristics, in which the use of the electromagnetically operated means makes coil-winding possible without any part of the apparatus interfering with the already wound layers of coil on the core.

These and other objects of the invention will be clear from the following detailed description of a preferred embodiment thereof as illustrated in the accompanying drawings, wherein:

FIG. 3 is a front view of an electromagnetic device of the invention;

FIG. 4 is a top plan view of FIG. 3; and

FIG. 5 is a side view of a reel and guide rolls, with upper part thereof broken away to illustrate their relative positions.

Figure 1:
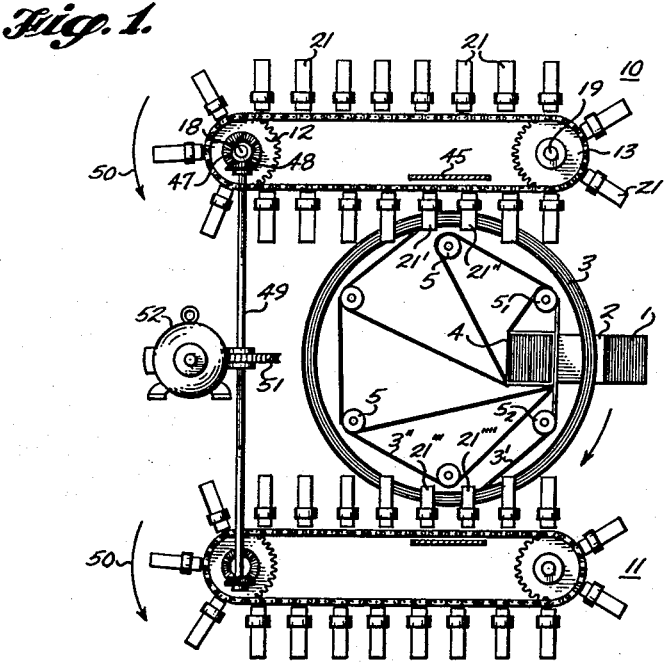
FIG. 1 is a front view of an embodiment of the apparatus of the invention, as shown in winding operation.

Now referring in detail to the drawings, there is shown in FIG. 1 a rectangular closed magnetic core 1 with a central opening or window 2, through which is passed part of a loop 3 of conductive wire which is to be formed into a winding 4 on the core 1.

The loop 3 is formed from a single length of wire wound in a predetermined number of turns, as will be described in detail hereinafter, and in the loop 3 the wire starts at one terminal in the inner bottom layer and winds outwardly layer upon layer, terminating at the other terminal in the outer or top layer. When coil-winding is carried out, the wire is drawn out at its inner terminal from the loop and is wound on a leg of the core 1. This will also be explained in detail later.

A plurality of guide rolls 5 are arranged inside the loop of wire and circumferentially thereof, each spaced an equal distance apart from another. As clearly shown in FIG. 5, each guide roll 5 consists of two semi-spherical bowls 7 arranged with their axes horizontally aligned and supported by suitable means not shown with their rounded bottom tips facing each other. Each bowl 7 has a disc 8 fitted therein with a horizontally extending axle 8', and a spring 9 placed between the inner bottom face of bowl 7 and the inner face of disc 8. The bowl 7 is thus movable axially upon disc 8 against spring 9 as shown by arrows, and rotation of the disc may be transmitted to the bowl by a well-known key-and-slot connection not shown.

Figure 2:
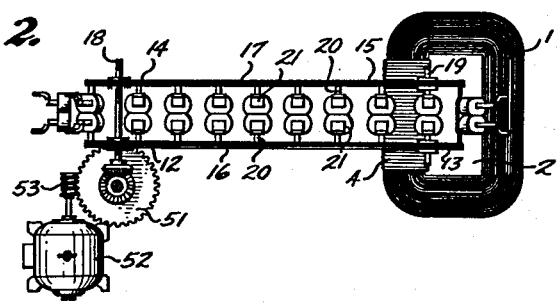
FIG. 2 is a top plan view of FIG. 1.

According to the invention, the loop of wound wire 3 is rotated by electromagnetically operated gripping means which, in the illustrated embodiment, comprises a pair of gripping means generally designated at 10 and 11 and positioned diametrically opposed outside the loop and adjacent thereto. Gripping means 10 and 11 are of the same construction, each including a plurality of electromagnetic devices 21 for gripping and moving the loop of wound wire and carried upon a chain-and-sprocket drive mechanism. The chain-and-sprocket mechanism consists of two pairs of spaced sprockets 12, 13 and 14, 15, and two strands of endless chain 16, 17 passing over the sprockets 12, 13 and 14, 15, respectively. Sprockets 12, 14 and 13, 15 are spaced apart axially on the horizontal shafts 18 and 19 respectively so that the pair of endless chains 16, 17 run parallel with each other. Chains 16, 17 are bridged by a number of plates 20 which are arranged at equal intervals over the whole length of the chains, as illustrated in FIG. 2. The structure is similar to that of a caterpillar.

As shown in FIG. 3, each plate 20 carries an electromagnetic device generally designated at 21, which comprises an inverted U-shaped stationary core 22 secured thereto by any suitable means and a movable core 23 consisting of two pairs of iron blocks 26, 27 and 30, 31, arranged like a jaw. Stationary core 22 has coils 25 on its two legs, and each of the legs has a dent or shoulder on its end face. Iron blocks 26, 27 are formed with a projection and disposed to face the two legs of the core 22 in such a manner that each of the projections slidably engages with each of the dents formed on the legs, normally with a predetermined width of gap 24 therebetween.

When the coils 25 are energized, the blocks 26, 27 are drawn toward the legs, decreasing the gaps 24 therebetween, and the gaps place a limit on the movement of the blocks 26, 27 toward the stationary core 22. The other two blocks 30, 31 of the movable core 23 are hinged at 32, 33 on the outer ends of the blocks 26, 27 respectively and usually kept open as shown by dash-and-dot lines in FIG. 3 by means of springs 34, 35 respectively. The angle of the blocks 30, 31 as they are opened may be adjusted by levers 36, 37, which are fixed respectively to hinges 32, 33 in such a manner that when blocks 30, 31 are opened the respective outer ends of levers 36, 37 come in contact with the lower free ends of two guide posts 38, 39 so as to be pushed thereby, upon movement of the blocks 26, 27, toward the stationary core 22. The guide posts are secured at their respective upper ends substantially perpendicularly to the opposite ends of the plate 20. The outer ends of laterally extending supporting arms 28, 29 are slidably connected to the guide posts 38, 39 and their inner ends are secured to blocks 26, 27, respectively. Coil springs 40, 41 spiralling about the posts 38, 39 respectively are fixed at their respective lower ends to the outer ends of the arms 28, 29 and at their respective upper ends to the opposite ends of the plate 20 so that the arms and consequently the movable core 23 hang from the coil springs.

Thus, when the coils 25 on the stationary core 22 are energized, the blocks 26, 27 are drawn toward the stationary core against coil springs 40, 41, simultaneously raising blocks 30, 31. As the blocks 30, 31 are raised, levers 36, 37 are pushed by the lower free ends of the posts 38, 39 to turn the blocks on their respective hinges 32, 33 in such directions as to close them, until they are closed to a predetermined angle, when their closing motion is accelerated by electromagnetic force already exerting thereon so as to rapidly close them completely as shown in FIG. 3.

Each of the plates 20 is provided with a pair of brushes 42, 43 electrically connected by leads not shown to the terminals of the coils 25 on the stationary core 22, and a collector, composed of a pair of parallel plates 45, 46 supplied with current from a suitable A.-C. or D.-C. source E, is positioned adjacent to the path of the brushes 42, 43 as they are carried therepast by the plates 20. Thus excitation of the coils 25 is achieved through contact of the brushes 42, 43 with the energized collector plates 45, 46.

Each electromagnetic device 21 is moved along by the chains 16, 17 driven through a suitable gearing mechanism described in detail later. As the device 21 arrives at a predetermined position on the path of its movement, part of the loop of wound wire 3 passes through the space 44 surrounded by the coils 25 on the stationary core 22, and the two blocks 26, 27 of the movable core 23. It is desirable that there be at least two of the devices 21 adjacent the wire loop 3 at one time, with part of the loop of wound wire passing through their spaces 44. In FIG. 1, devices 21′, 21″ and 21‴, 21⁗ are shown in such condition. The collector plates 45, 46 extend in the same direction as that of movement of the brushes 42, 43 and are arranged for successive contact with the brushes. The length of the collector plates is preferably a little less than twice the distance between two pairs of brushes on two adjacent plates, so that at least two of the electromagnetic devices 21 are in contact with the collector at one time.

The other electromagnetically operated gripping means 11 is of exactly the same construction as means 10 and is positioned, in the illustrated embodiment, at the diametrically opposite side of the loop of wound wire 3, which passes through the spaces 44 of at least two of the electromagnetic devices thereof, such as those numbered 21‴ and 21⁗.

As mentioned hereinbefore, the two gripping means 10, 11 are driven by the chain-and-sprocket mechanism, a drive for which will now be described. Each of shafts 18 is provided at its one end with a bevel gear 47, with which meshes a bevel pinion 48 fixed to each end of a shaft 49, on the middle portion of which is mounted a worm wheel 51 driven by a worm 53 secured to the output shaft of a motor 52. It will be clear from the foregoing that rotation of motor 52 runs the chains 16, 17 through the gearing in the direction shown by arrows 50 in FIG. 1.

FIG. 5 illustrates partly in section a portion of a guide frame or reel 54 for making the loop of wound wire 3 (FIG. 1) from a single length of wire. The reel is annular in shape and of much the same diameter as that of a desired loop of wound wire to be obtained therefrom. The reel is assembled by securing together by bolts 57 two annular frames 55, 56, of each T-shaped in cross section and engaging each other at 58 in a central plane perpendicular to the axis of the reel. Each of the two annular frames may further be divided circumferentially into three or more arcuate components. When assembled as partially illustrated in FIG. 5, the reel (not shown in FIG. 1) not only circumscribes and rests upon the circumferentially arranged rolls 5, but also passes through the central opening of the closed magnetic core 1, with diametrically opposed portions of the reel being positioned in the spaces 44 of the electromagnetic devices 21′, 21″ and 21‴, 21⁗, as the blocks 30, 31 of the movable cores 23 of the electromagnetic devices are opened by opening the current supply circuit thereto. The reel, duly set up and positioned, has its inner lateral guide surface contacting the outer lateral surfaces of the bowls 7 of rolls 5, whereby rotation of shafts 8′ by any suitable means not shown will rotate the discs 8 and bowls 7 through the key-and-slot connection and the reel 54 through friction transmission. It will be clearly seen that setting up of the reel from its components will not be obstructed by the presence of the electromagnetic devices 21 or the core 1.

A predetermined single length of conductive wire to be formed into a winding on the core 1 is first secured at its one terminal to a point of the outer lateral surface of the reel 54 and then is wound a predetermined number of turns thereupon through rotation of the guide rolls 5. When the reeling is finished, the bolts 57 are unfastened to disassemble the reel to be removed therefrom to leave there a loop of wire wound in skeins or hanks. Upon disassembly of the reel, the loop of wound wire expands radially due to its own resiliency into the spaces 44 of the electromagnetic devices 21′, 21″, 21‴, 21⁗ to bear against the coils 25 therein, whereby the expansion is obstructed and the loop of wound wire is held there steadily.

When the brushes 42, 43 that are in contact with the collector plates 45, 46 of the electromagnetic gripping means 10, 11 are supplied with current from source E by closing the circuit thereto, the coils 25 on the stationary cores 22 of the electromagnetic devices 21′, 21″, 21‴, 21⁗, are energized to draw their respective movable cores 23 to close the blocks 30, 31, thereby tightly gripping those portions of the loop 3 passing through the spaces 44.

With the loop 3 gripped in the above way and its terminal in the inner layer of turns of the loop secured to a point on a leg of the closed core 1, the loop is rotated in the direction of an arrow shown in FIG. 1 in a manner described in detail later, so that wire is continuously drawn out of the loop and wound on the core to form a winding 4 thereupon.

This process will be clearly seen from FIG. 1. Assuming that in the loop 3 the wire is wound clockwise in a plurality of turns and that at a stage of the process of forming a winding on the core 1, a length of wire 3' is drawn out from the loop 3 at the device 21'''' and passes over guide rolls 5₂, 5₁, leading to the winding 4 on the core 1, when the loop is rotated clockwise, the wire 3' between the device 21'''' and the core 1 is tensioned. As the rotation progresses, the tension of the wire 3' increases until it pushes the pair of bowls 7 of the roll 5₁, and then those of the roll 5₂, laterally apart against the springs 9, slipping through the bowls 7 radially inwardly and lies on the core. Further rotation of the loop 3 will draw more wire from the loop. It may be apparent from FIG. 1 that the point at which the wire is drawn out from the loop is now near the device 21' diametrically opposite to the device 21'''' at which the wire was previously drawn out from the loop. Thus, the wire 3" now starts from the loop at the device 21' and leads to the partially wound coil 4 on the core 1 passing over those of the circumferentially arranged rolls positioned therebetween. As the loop 3 is further rotated clockwise, the wire 3" slips radially inwardly through the pair of bowls of one of the rolls after another and lies wound on the core.

Rotation of the loop is conducted by the electromagnetically operated gripping means 10, 11. It is necessary that at least two spaced portions at one time of the circumference of the loop 3 should always be gripped by electromagnetic devices 21. In FIG. 1, electromagnetic devices 21', 21" on the side of the means 10 and 21''', 21'''' on the side of the means 11 are shown gripping the loop 3, with their respective pairs of brushes contacting the collectors of the two means.

When motor 52 drives the chains 16, 17 of the two means simultaneously and in the same direction shown by the arrows 50 in FIG. 1, the devices gripping the loop 3 carry it along, until the devices 21", 21''' are respectively carried past the collectors so as to break contact of their respective brushes therewith, thereby deenergizing the coils 25 on the stationary cores 22 of the devices 21", 21''' to lose their respective grip on the loop. At this time the devices 21', 21'''' still hold their grip on the loop. Simultaneously with this, the brushes on the devices following the devices 21' and 21'''' respectively come in contact with the collector plates 45, 46, whereupon the coils 25 on those following devices are energized to close the respective jaws of blocks 30, 31 of the movable cores 23 thereof to tightly grip the loop of wound wire. Thus, the loop 3 is now gripped by the device 21' and the succeeding one on the side of the means 10 and the device 21'''' and the succeeding one on the side of the means 11. As these devices are moved by the chains, they carry along the loop, until first the devices 21' and 21'''' and then after an interval said following devices are carried past the collectors to break contact therewith, losing their grip on the loop, which is now gripped by succeeding devices.

In this way, the loop of wound wire is incessantly gripped at substantially diametrically opposed portions thereof by electromagnetic devices one after another and moved thereby for continuous, smooth rotation about its own axis. Let it be assumed again that a length of wire 3' is drawn out from the loop 3 at the electromagnetic device 21'''' that has most recently come to grip the loop, and leads to the winding 4 on a leg of the closed magnetic core 1, passing over the rolls 5₁, 5₂. So long as the wire 3' remains passing over any one of the rolls, the number of turns of wire of the loop that is to be gripped by a succeeding device remains the same as that which was gripped by the preceding one; in other words, the point at which the wire is drawn out from the loop remains approximately at 21''''.

As the loop is rotated, the wire 3' is increasingly tensioned, until it has slipped through all the rolls it passed over, and come to be tensioned directly between the device 21'''' that has last come to grip the loop and the partly wound coil 4 on the core 1 without passing over any one of the interposed rolls. After this, the devices, which newly come to grip the loop one after another, grip it with one turn fewer of wound wire than when it was gripped by the preceding devices, so that a longer length of wire 3'' will be freed of the grip of the devices at the means 11. Now the wire 3'' is drawn out from the loop 3 at the device 21' on the means 10, and with continuous rotation of the loop, the process mentioned above progresses. As the winding 4 grows on the core 1, the loop 3 decreases in turns of wire until it is completely fed out to the winding 4 that has been completed on the core 1.

In the apparatus according to this invention, any parts of the drive means for rotating the loop of wound wire arranged in linked relationship with the closed magnetic core do not pass through the opening of the core. This is a particular feature of the invention, with the advantage that the winding apparatus of the invention may be used with any closed cores, however small their central openings may be, so long as they are large enough to allow for the thickness of the loop.

Another feature of the invention is that the electromagnetic devices grip the loop at two or more points spaced apart on the circumference thereof, and carry it along a predetermined distance and then release the grip on it and are replaced by succeeding devices, which will operate just as the preceding ones did. Thus, the loop is successively and incessantly gripped by at least two electromagnetic devices at one time and moved along, so that smooth continuous rotation of the loop is secured.

With the apparatus according to the invention, wire to be wound on the core is tightly gripped by an electromagnetic device at a point where it is drawn out from the loop of wire. This prevents any more wire from being drawn out therefrom until the portion of wire between the drawn-out point and the closed magnetic core is tensioned without passing over the interposed guide rolls. This makes it possible to perform winding operation with wire always kept in a suitable degree of tension.

The construction illustrated and described in detail above is only one preferred embodiment of the invention. It is apparent that modifications, alterations and changes thereof may be made without departing from the true scope and spirit of the principles of the invention. For example, the two electromagnetically operated gripping means employed in the above illustrated embodiment may be replaced by a single gripping means, in which the pair of chains is so arranged as to semi-circumscribe the loop of wound wire at the side opposite to where the closed magnetic core is positioned, with at least two electromagnetic devices of similar type mounted on the chains in spaced relation so as to grip and move the loop a predetermined distance for continuous rotation.

What I claim is:

1. Apparatus for winding wire on the core of stationary induction means and the like, comprising means for forming a continuous multi-turn loop of wire in linked relation with said core in preparation for winding the same thereon, electromagnetically operable means for turning said loop circumferentially while winding wire therefrom onto said core, said turning means comprising a plurality of loop gripping devices, means operable to carry said devices continuously past the outside of said loop in a direction tangential thereto at at least two circumferentially spaced points, electromagnetic means for actuating said gripping devices to grip the loop at said points when in position to rotate the loop in circumferentially of itself and to release said loop when not in position to rotate the same, whereby to continuously rotate said loop through said core, and wire-contacting guide means operable to draw wire from the inside of said loop and apply said wire under continuous tension to said core during revolution of the loop.

2. The apparatus defined in claim 1 wherein each of said electromagnetic means comprises an electrically energizable coil means, said gripping devices including core means disposed in flux linkage communication therewith, said core means including a movable portion having normally open jaws adapted to close and grip said wire loop, and spring means usually maintaining said jaws open, said jaws being operable to close against the bias of said spring means in response to electromagnetic force generated by energization of said coil means.

3. The apparatus defined in claim 2 wherein said carrying means comprises at least one pair of parallel continuous chain means supported upon rotatable sprockets and carrying said gripping devices individually between corresponding links thereof, and wherein said electromagnetic means includes electrical terminal means on each of said devices and energizingly connected to said coils, and associated fixed electrical contact means connected to a source of electrical energy and disposed adjacent said chain means in positions whereby said terminals contact said contact means when said devices successively arrive in position to grip and turn said loop.

References Cited by the Examiner

UNITED STATES PATENTS

| 2,959,366 | 11/60 | Grant et al. | 242—4 |
| 2,978,193 | 4/61 | Kelly | 242—4 X |

FOREIGN PATENTS 846,993 9/60 Great Britain.

MERVIN STEIN, *Primary Examiner.*

RUSSELL C. MADER, *Examiner.*